CHARLES A. SEELY.
Improvement in Process and Apparatus for Removing Tin from Tin-Scrap.
No. 127,375.  Patented May 28, 1872.
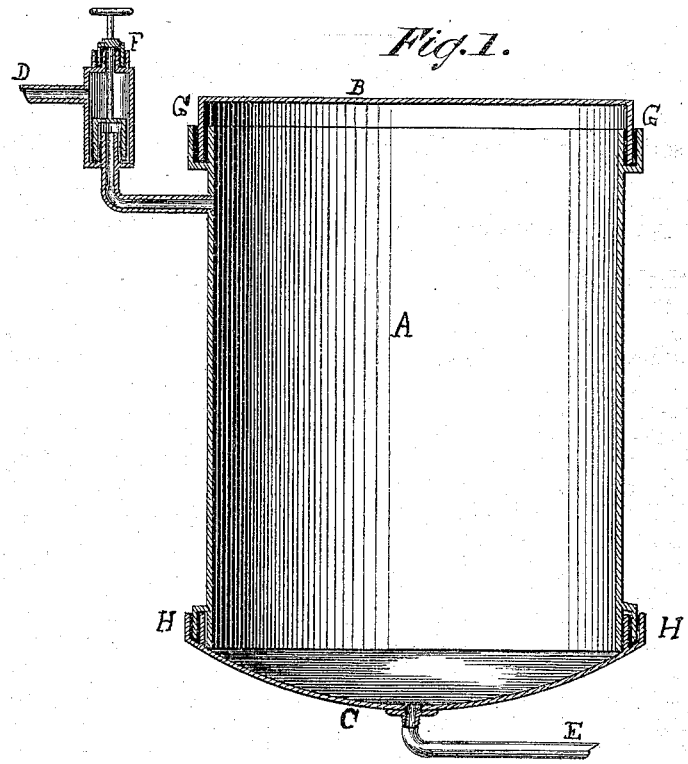
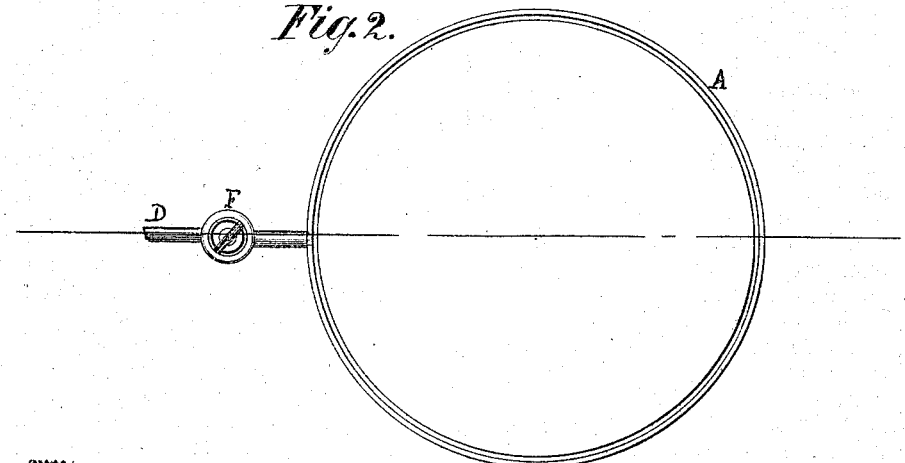

UNITED STATES PATENT OFFICE.

CHARLES A. SEELY, OF NEW YORK, N. Y.

IMPROVEMENT IN PROCESSES AND APPARATUS FOR REMOVING TIN FROM TIN SCRAP.

Specification forming part of Letters Patent No. 127,375, dated May 28, 1872.

Specification describing an Improved Apparatus and Process for the Separation of the Tin and Iron of Tin Scrap, invented by CHARLES A. SEELY, of the city, county, and State of New York.

Figure 1 is a vertical section of my apparatus. Fig. 2 is a plan of the same.

A is a cylinder of boiler-iron, closed at the top by the movable cover B and below by the movable bottom C. The cover B is made air-tight by the water-seal represented at G G, and the bottom by the water-seal represented at H H. D is an inlet-pipe, provided with a water-seal valve, F, and E is an exit-pipe. For the water-seals I find it preferable to use in the place of simple water a saline or other solution of greater specific gravity. For the water-seals of the valves, when made of lead, I find sulphuric acid to answer well. The lower end of the cylinder A has attached to it, by means of a hinge, a grating or false bottom to serve as a support to the charge of tin scrap. The grating is provided with a bolt, hook, or latch, which permits, at pleasure, the closing of the grating against the lower end of the cylinder or its opening downward. The cylinder C, with its immediate attachments, I call a treating-tank, and my process requires two or more sets of apparatus such as described.

The method of using the apparatus is as follows: The grating is fastened up against the cylinder, and the receptacle thus made is filled with tin scrap. The cover B and bottom C are adjusted to their places, and now chlorine gas is brought upon the tin scrap through the inlet-pipe D. The chlorine at once combines with the tin which it touches, and the product is bichloride of tin. This latter, either as vapor or liquid, in large part flows downward and away through the exit-pipe E, which pipe may lead directly into water or into a condensing-worm. The flow of chlorine upon the tin scrap is continued until all or nearly all of the tin has been dissolved. At this stage of the process the treating-tank contains, besides the iron and atmospheric air, a considerable amount of free chlorine and of bichloride of tin in vapor and in the liquid state. The removal and recovery of these is an important feature of my invention. I provide myself with a duplicate of the apparatus above described, and, having its treating-tank charged with fresh tin scrap and adjusted as for the admission of chlorine, I cause the gas and vapor of the first treating-tank to flow into the second treating-tank. This transfer I effect by forcing dry air into the first tank at its top by means of any suitable blowing or pumping apparatus, and thereby the gas and vapor are compelled to travel downward and out through the exit-pipe E to the inlet-pipe of the second tank. When the gas and vapor have been thus removed a considerable quantity of the bichloride is still held adhering to the iron. This I remove and recover by forcing heated dry air into the tank and causing the out-going air charged with bichloride to come into contact with water, which readily absorbs and retains the bichloride; or, instead of heated air, water in the form of saturated steam or otherwise may be showered in to remove the bichloride. The de-tinned iron is now to be discharged from the treating-tank. The bottom C is dropped and rolled or slid out of the way, the grating unloosed and dropped, and the charge of iron falls into a suitable receptacle. In the mean time the process in apparatus No. 1 is progressing by the admission into it of fresh chlorine, and it is so managed that when No. 1 is charged with fresh tin scrap No. 2 shall be ready to discharge into it its excess of chlorine.

Instead of two sets of apparatus it may be sometimes found advisable to employ a series of three or of a greater number.

Although I find the method of transferring the mixed gas and vapor above described to be sufficiently perfect, there are certain variations of it, or substitutes for it, which form a part of my invention. These are as follows: First, connect the outlet of the first tank with a pipe leading through the bottom of the second tank, and apply an exhaust at the top of the second tank; second, pump the contents of first tank into the second directly without the intervention of air as a forcing medium; third, place the second tank below the first tank, and allow the gas and vapor of the first to flow into the second by gravity. The suitable arrangement of pipes, &c., for each of these cases will readily occur to any one familiar with the art.

I claim as my invention—

1. The treating-tank, with a bottom or a bottom and cover provided with a liquid-seal, substantially as set forth.

2. The combination of the cylinder A, movable bottom C, and top B, so as to form a gas-tight apparatus which may be opened and closed for charging and discharging its contents, substantially as described.

3. The combination of two or more treating-tanks so as to operate substantially as specified.

4. The transfer of the gas and vapor from one treating-tank to another by either of the methods, substantially as described.

5. The removal of the adherent bichloride by means of heated air, as described.

CHARLES A. SEELY.

Witnesses:
R. P. STEVENS,
HENRY WURTZ.